No. 832,732. PATENTED OCT. 9, 1906.
C. K. JANSEN & F. & K. EISBRENNER.
BLANK FOR FORMING FIVE AND THREE TINED PITCHFORKS.
APPLICATION FILED JAN. 20, 1906.

2 SHEETS—SHEET 1.

WITNESSES:

INVENTORS,
Carl K. Jansen
Frank Eisbrenner
Kash Eisbrenner
BY and
ATTORNEYS.

No. 832,732. PATENTED OCT. 9, 1906.
C. K. JANSEN & F. & K. EISBRENNER.
BLANK FOR FORMING FIVE AND THREE TINED PITCHFORKS.
APPLICATION FILED JAN. 20, 1906.

2 SHEETS—SHEET 2.

WITNESSES:

INVENTORS.
Carl K Jansen
and Frank Eisbrenner
Kash Eisbrenner
BY Ridout + Maybee
ATTORNEYS

UNITED STATES PATENT OFFICE.

CARL K. JANSEN, FRANK EISBRENNER, AND KASH EISBRENNER, OF TILSONBURG, ONTARIO, CANADA; SAID FRANK EISBRENNER AND SAID KASH EISBRENNER ASSIGNORS TO THE MAPLE LEAF HARVEST TOOL COMPANY, LIMITED, OF TILSONBURG, CANADA.

BLANK FOR FORMING FIVE AND THREE TINED PITCHFORKS.

No. 832,732.

Specification of Letters Patent.

Patented Oct. 9, 1906.

Application filed January 20, 1906. Serial No. 297,055.

*To all whom it may concern:*

Be it known that we, CARL K. JANSEN, FRANK EISBRENNER, and KASH EISBRENNER, of the town of Tilsonburg, in the Province of Ontario, Canada, have invented certain new and useful Improvements in Blanks for Forming Five-Tined and Three-Tined Pitchforks, of which the following is a specification.

The object of our invention is to devise a blank for the manufacture of five-tined and three-tined hay-forks, manure-forks, and the like, which may be stamped from the stock at one operation without waste of material and in which the stock for the center tine is exactly opposite and substantially in line with the stock for the shank, and in which the stock for the outer tines requires no spacing before it is in shape for the rolls; and our invention consists, essentially, of the construction of the blank hereinafter more specifically described and then definitely claimed.

Figure 1:
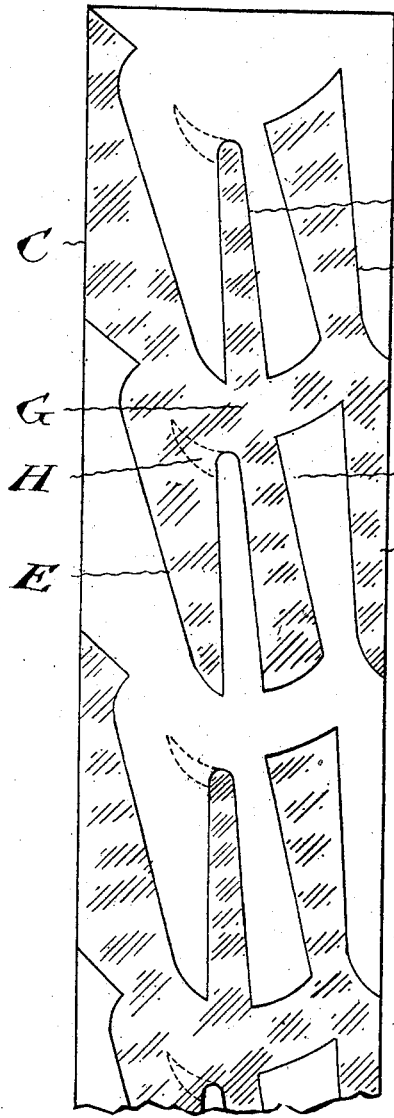
Figure 2:
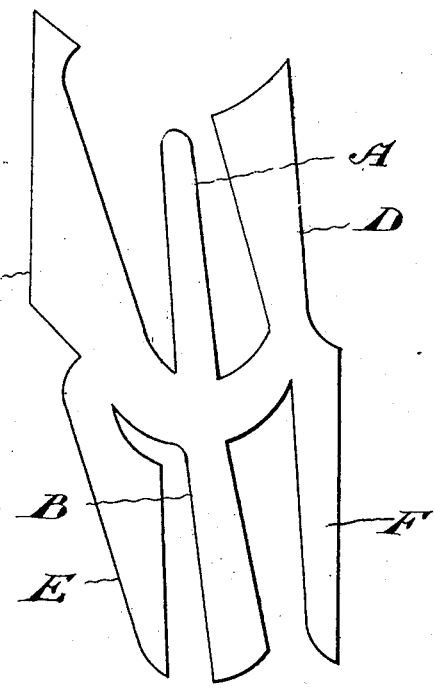
Figure 3:
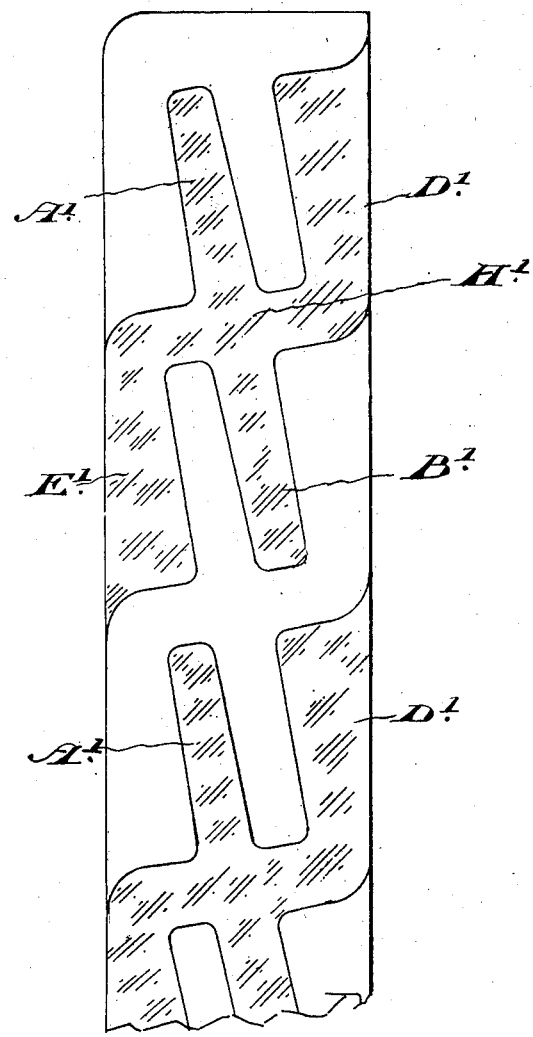
Figure 4:
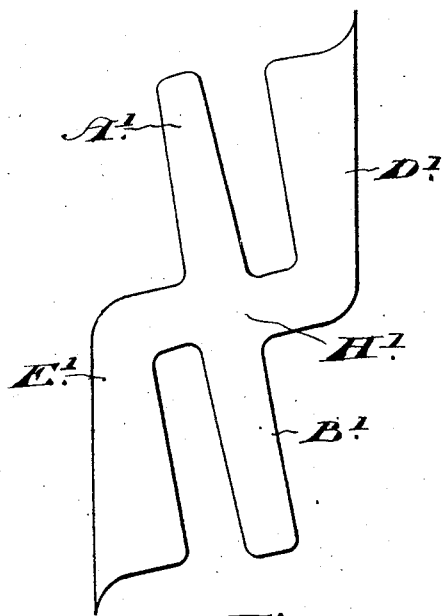

Figure 1 is a plan view showing two partly-completed blanks in a five-tined fork and parts of two others. Fig. 2 is a plan view of a single completed blank. Fig. 3 is a plan view similar to Fig. 1, showing a modification of the invention, showing it adapted for three-tined pitchforks. Fig. 4 is a plan view of a single blank for three-tined pitchforks.

In the drawings like letters of reference indicate corresponding parts in the different figures.

Referring particularly to Fig. 1, it will be seen that each blank comprises a shank portion A, a center tine portion B, outer tine portions C and D, and inner tine portions E and F. The die used in stamping the blank is so shaped that as stamped out the shank portion A is separated from the outer tine portions C and D by spaces corresponding exactly in shape and size to the inner tine portion E and the center tine portion B, while the center tine portion B is separated from the inner tine portions E and F by spaces corresponding exactly in shape and size to the shank portion A and the outer tine portion D. The base of the center tine portion is opposite to the base of the shank portion A, while the center tine portion and shank are as a whole substantially in line with one another, and the line on which they lie crosses diagonally the center line of the stock, which is substantially the line joining the centers of the individual blanks when the latter are fitted together with their shank and tine portions interlocking, as shown. This diagonal position of the shank and center tine portion is essential to the proper formation of the blank, for it will be seen that the width of the blank has to be divided to provide stock for six portions—namely, the five-tined portions and a shank portion. As this is an even number of portions, it means that the center tine portion and shank portion cannot lie on the center line of the stock, and yet it is essential that they lie on the central line of the completed fork. This difficulty is dodged by giving them the diagonal position described, by which we are enabled to keep them in line with one another if they occupy substantially a central position in the blank and yet have the stock divided among the tine portions and shank in substantially a proper proportion. The head of the fork G, it will be noticed, is curved, the curve being convex toward the center tine portion B. When this curved fork-head is straightened out, it gives the necessary width of head for the proper spacing of the tines. From the construction described it follows that after the blank has been stamped from the bar the metal remaining at the end of the bar forms part of the next blank. Hence at each stroke of the die a complete blank is turned out without waste, the only waste occurring at the commencement of the operation, when a piece has to be stamped out corresponding to the center tine portion, the two inner tine portions, and the head of the fork. Before the blanks are stamped off and the first operation ready for the rolls it is necessary to cut out a horn-shaped piece H, which completes the convex surface of the head of the fork and gives the proper spacing for the base of the inner tine portion E.

From the construction described it will be seen that we have devised a blank which is ready for the rolls as soon as the stamping is completed. This renders the present blank a great improvement on that shown in Figs. 3 and 4 of United States Patent No. 761,681, dated June 7, 1904. In this prior form the inner tine portions were formed by splitting the outer tine portions and after splitting these tine portions required to be separated and spaced, involving additional operations and the services of a larger number of men. It will also be noticed that in this prior patent, although the base of the center tine portion is exactly opposite the shank, yet it was necessary to jog the center tine portion. This jog is entirely avoided in the present construction.

In Figs. 3 and 4 we show the invention adapted for forming blanks for three-tined pitchforks. It will be noted that the blank is substantially similar to that shown in Fig. 1, with the exception that the portions lettered C and F are omitted and that owing to the fork being narrower it is not necessary to cut out the horn-shaped piece H, as in the five-tined blank. In Figs. 3 and 4 A' is the shank portion, B' is the center tine portion, and E' and D' the outer tine portions, one extending parallel to the center tine portion and the other parallel to the shank portion. The shank portion is separated from the outer tine portion D' by a space corresponding in size and shape to the central tine portion B'. The outer tine portion E' is separated from the center tine portion B' by a space corresponding in size and shape to the shank portion A'. As the shank and center tine portion are opposite and in line with one another all the advantages of the blank described and claimed in the United States Patent hereinbefore referred to are attained. In this former patent one of the outer tine portions was separated only by a cut from the shank portion and subsequently required separating and spacing, (see Figs. 1 and 2 of the said patent,) and a jog also occurred in the center tine portion. By the present invention these advantages are entirely overcome.

What we claim as our invention is—

1. An integral blank for forming pitchforks and the like, comprising the shank portion; the center tine portion extending in the opposite direction to and lying substantially in line with the said shank portion; outer tine portions separated from the shank portion by spaces corresponding in size and shape to an inner tine portion and the center tine portion; and inner tine portions separated from the center tine portion by spaces corresponding in shape and size to the shank portion and an outer tine portion, the shank and center tine portion being on a line diagonal to the outermost edges of the blank, and the outermost edges being parallel to one another, substantially as described.

2. An integral blank for forming pitchforks and the like, comprising the shank portion; the center tine portion extending in the opposite direction to and lying substantially in line with the said shank portion; outer tine portions separated from the shank portion by spaces corresponding in size and shape to an inner tine portion and the center tine portion; and inner tine portions separated from the center tine portion by spaces corresponding in shape and size to the shank portion and an outer tine portion; and a curved fork-head connecting the parts, the shank and center tine portion being on a line diagonal to the outermost edges of the blank, and the outermost edges being parallel to one another, substantially as described.

3. An integral blank for forming pitchforks and the like, comprising the shank portion; the center tine portion extending in the opposite direction to and lying substantially in line with the said shank portion; outer tine portions separated from the shank portion by spaces corresponding in size and shape to an inner tine portion and the center tine portion; inner tine portions separated from the center tine portion by spaces corresponding in shape and size to the shank portion and an outer tine portion; a curved fork-head connecting the parts, the shank and center tine portion being on a line diagonal to the outermost edges of the blank, and the outermost edges being parallel to one another, and a curved horn following the curve of the fork-head, being cut out of the inner tine portion adjacent to the shank-space, substantially as described.

4. In an integral blank for forming pitchforks and the like a shank portion; an outer tine portion extending in the opposite direction to and lying substantially in line with the said shank portion; a second tine portion extending in the same direction as the shank, and separated from the shank portion by a space corresponding in size and shape to the center tine portion; a third tine portion extending in the same direction as the center tine portion, and separated from the center tine portion by a space equal in size and shape to the shank portion, the shank and center tine portion being on a line diagonal to the line passing through the centers of a series of blanks when the latter are fitted together with their spaces and shank and tine portions engaged, substantially as described.

Signed at Tilsonburg, Ontario, January 13, 1906.

CARL K. JANSEN.
FRANK EISBRENNER.
KASH EISBRENNER.

In presence of—
W. A. DOWLER,
C. H. DENTON.